United States Patent
Lardellier

(10) Patent No.: US 7,581,920 B2
(45) Date of Patent: Sep. 1, 2009

(54) METHOD FOR AIR CIRCULATION IN A TURBOMACHINE COMPRESSOR, COMPRESSOR ARRANGEMENT USING THIS METHOD, COMPRESSION STAGE AND COMPRESSOR INCORPORATING SUCH A ARRANGEMENT, AND AIRCRAFT ENGINE EQUIPPED WITH SUCH A COMPRESSOR

(75) Inventor: Alain Lardellier, Melun (FR)

(73) Assignee: SNECMA, Paris (FR)

( * ) Notice: Subject to any disclaimer, the term of this patent is extended or adjusted under 35 U.S.C. 154(b) by 497 days.

(21) Appl. No.: 11/236,524

(22) Filed: Sep. 28, 2005

(65) Prior Publication Data

US 2006/0222485 A1  Oct. 5, 2006

(30) Foreign Application Priority Data

Sep. 30, 2004  (FR) .................................. 04 52202

(51) Int. Cl.
*F01D 9/06* (2006.01)
*F01D 5/18* (2006.01)

(52) U.S. Cl. ........................... 415/1; 415/115; 415/144; 415/168.4; 415/173.7; 415/174.5; 415/914; 416/97 R

(58) Field of Classification Search ...................... 415/1, 415/115–117, 144–145, 168.1, 168.2, 168.4, 415/169.1, 914, 174.4, 174.5, 230, 173.7; 416/96 R, 96 A, 97 R
See application file for complete search history.

(56) References Cited

U.S. PATENT DOCUMENTS

| 2,720,356 | A | * | 10/1955 | Erwin | 415/115 |
|---|---|---|---|---|---|
| 2,848,155 | A | * | 8/1958 | Hausmann | 415/115 |
| 3,031,132 | A | * | 4/1962 | Davies | 415/145 |
| 3,365,124 | A | * | 1/1968 | Burge et al. | 415/115 |
| 3,694,102 | A | * | 9/1972 | Conrad | 415/115 |
| 3,846,038 | A | | 11/1974 | Carriere et al. | |
| 3,849,023 | A | * | 11/1974 | Klompas | 415/173.7 |
| 3,993,414 | A | | 11/1976 | Meauze et al. | |
| 6,004,095 | A | | 12/1999 | Waitz et al. | |
| 6,428,271 | B1 | | 8/2002 | Ress, Jr. et al. | |
| 2002/0150470 | A1 | * | 10/2002 | Tiemann | 415/115 |

FOREIGN PATENT DOCUMENTS

| FR | 71.46854 | 8/1973 |
|---|---|---|
| FR | 73 37751 | 5/1975 |
| GB | 1085227 | 9/1967 |
| WO | WO 98/30802 | 7/1998 |

* cited by examiner

*Primary Examiner*—Christopher Verdier
(74) *Attorney, Agent, or Firm*—Oblon, Spivak, McClelland, Maier & Neustadt, P.C.

(57) ABSTRACT

An air circulation method in a turbomachine compressor includes minimizing an inner flowpath between two adjacent blades by providing labyrinths on an inner casing between the two adjacent blades, and sucking in air from the minimized inner flowpath through a radially inner orifice of a vane faced by the labyrinths. The method further includes directing the sucked in air through the vane, bleeding the air from the vane through a radially outer opening of the vane and through an orifice of an outer casing. The air is collected from the vane into a manifold outside the compression stage. A compressor arrangement for circulating air includes a suction device for sucking in air present in the inner flowpath between labyrinths and the vane, and for sending the air into the vane of the stator. The arrangement also includes a device for bleeding air in the vane of the stator and for sending the air outside the compressor.

38 Claims, 9 Drawing Sheets

METHOD FOR AIR CIRCULATION IN A TURBOMACHINE COMPRESSOR, COMPRESSOR ARRANGEMENT USING THIS METHOD, COMPRESSION STAGE AND COMPRESSOR INCORPORATING SUCH A ARRANGEMENT, AND AIRCRAFT ENGINE EQUIPPED WITH SUCH A COMPRESSOR

RELATED DOCUMENT

The present document claims priority to French patent application Ser. No. 04 52 202 filed Sep. 30, 2004, which is hereby incorporated herein by reference.

TECHNICAL FIELD

This invention relates to the field of turbomachine compressors, and particularly to aircraft engine compressors.

It relates to an air circulation method in a turbomachine compressor.

It also relates to a compressor arrangement for using the air circulation method.

It also relates to a compression stage using such a compressor arrangement.

It also relates to a compressor comprising such a compressor arrangement.

Finally, it relates to an aircraft engine equipped with such a compressor.

In the following description, the stationary blades of the stator will be called "vanes" and the rotating blades of the rotor will be called "blades".

BACKGROUND OF THE INVENTION

In a manner known in itself, a turbomachine compressor comprises:
 several compression stages, each composed of a bladed rotor and a bladed stator,
 a flowpath in which the rotor blades and the stator vanes are located.

The flowpath may be delimited between an outer casing and an inner casing, or between an outer casing and a central hub.

There is a functional clearance in the flowpath between the blades of each rotor and the wall of the outer casing. Similarly, there is a functional clearance between the blades of each stator and the wall of the inner casing or the hub. Secondary flows pass through these functional clearances in the opposite direction (from the downstream side towards the upstream side) to the direction of the main flow (from the upstream side towards the downstream side) that are parasite flows. Those skilled in the art would generally like to eliminate or reduce parasite airflows that develop inside the compressor and that reduce the aerodynamic efficiency of the compression stage. In practice, the compressor structure is designed so as to minimize these clearances and therefore parasite flows.

With the same objective of improving operation of a compressor, it is known that applying suction to the boundary layer of the main flow at one or several appropriate locations on the profile of the blades and vanes can improve the aerodynamic situation of a compression stage to increase the compression ratio of the stage without deteriorating its efficiency or its stall limit. This means that a compressor with a significantly smaller number of stages can be used than is possible with a compressor in which no suction is applied to the profiles, for a given compression ratio.

Document GB 1 085 227-A discloses vanes or blades in which cavities are formed connected to the surface of the blade by orifices. These orifices are located close to the trailing edge of the blades and can apply suction to suck in the boundary layer of the blades in their cavity. A passage passing through the base of each blade provides a communication between the cavity in this blade and a circuit inside the compressor, in which a suction pump is fitted. Controlling boundary layer flows in this way reduces turbulence inside the turbomachine, thus reducing the noise made by the turbomachine.

Document FR 2 166 494-A5 discloses suction openings formed in the wall of the compressor outer casing to eliminate the boundary layer that develops between the blades of the two successive compression stages. These suction openings are connected to suction means, for example such as a throttle and/or a flow regulator. Air sucked in is then rejected into the atmosphere or is reused.

Document FR 2 248 732-A5 discloses an improvement to FR 2 166 494-A5, the purpose of which is to eliminate or reduce the boundary flow layer along the outer casing of the compressor and the boundary flow layer along the blades. A boundary layer trap is formed in each blade, composed of a channel connected to boundary layer suction means. The channel opens up onto the suction face of the blade, in an area in which the curvature is changing. The suction means, similar to those in FR 2 166 494, are located in the casing or in the hub of the compressor. There are also openings provided in the wall of the compressor casing as in FR 2 166 494-A5.

Document WO 98/30802-A1 discloses vanes or blades in which cavities are formed. Nozzles, slits, porous or similar surfaces are provided through the vanes or blades to suck in the boundary layer of each blade into its inner cavity. The sucked in air is then transported in the cavity towards one end of the blade to be evacuated. When air is evacuated towards the end of a blade, it is evacuated outside the compressor through an opening in the outer casing of the compressor facing this blade and that opens up into a manifold, that prevents evacuated air from re-entering the compressor.

Document U.S. Pat. No. 6,004,095-A disclosed several arrangements of turbomachine compressors for blowing and/or sucking in air, and for circulating blown or sucked in air in order to reduce noise generated by the turbomachine.

In one arrangement disclosed in U.S. Pat. No. 6,004,095-A, the blades are provided with cavities. The cavities are connected to the surface of the blade through orifices through which air is sucked in. They are connected to an inner chamber in the compressor through a passage passing through their base, through which air is sucked into another part of the turbomachine. Suction is done using a pump.

In another arrangement disclosed in U.S. Pat. No. 6,004,095-A, the blades are provided with cavities. The cavities are connected to the surface of the blade through orifices through which air is sucked in. They are open near their end to a manifold with a porous wall through which air is sucked in towards a chamber located beyond the wall of the outer casing, through an opening formed in said wall. Slits can also be provided in the wall of the outer casing, on the upstream side of the blades to suck in the boundary layer of the wall of the outer casing towards said chamber. Suction is done by a pump.

In another arrangement disclosed in U.S. Pat. No. 6,004,095-A, the compressor is provided with guide vanes on the upstream side of the fan. Air originating from the low pressure compressor on the downstream side of the fan is returned through an inner chamber to the guide vanes, through their inner base and their outer base. As a variant, these guide vanes may also be fitted with one or several cavities connected at their surface through orifices and provided with passages passing through their base(s). Thus, air sucked in through the orifices is transported inside the cavity(ies) towards the hub and/or towards the rotor casing using a pump.

Therefore, the documents mentioned above describe arrangements including means of reducing or eliminating boundary layer flows that develop around the vanes or blades and/or along the outer casing of the compressor.

These arrangements use pumps or similar means as air suction means.

SUMMARY OF THE INVENTION

This invention is applicable to a compressor of the type including:
- several compression stages each composed of a bladed rotor and a bladed stator,
- an outer casing and an inner casing delimitating a flowpath in which the rotor blades and stator vanes are located,
- an outer part of the flowpath called the "outer flowpath", corresponding to functional clearances between the outer casing and the rotor blades, and
- an inner part of the flowpath called the "inner flowpath", corresponding to functional clearances between the inner casing and the stator vanes.

The general purpose of this invention is to propose an inexpensive and high performance method and arrangement for a turbomachine compressor, designed to make air circulate inside and outside the compressor, without the use of specific suction means that reduce performances, such that as suction pumps, in order to eliminate or at least reduce parasite flows of boundary layers that develop at the walls of the outer and inner flowpaths, and so as to eliminate or at least reduce the boundary layer of the profiles of the vanes and blades.

Thus, it is possible to:
- bleed secondary flows of the inner flowpath of a turbomachine compressor, flowing from the downstream side towards the upstream side, within the functional clearances existing along the inner casing of the compressor; and direct the airflow thus bled to a supply to systems useful for operation of the turbomachine, for example cooling of hot parts, ventilation of cavities, avionics bleeds, without the use of forced suction means such as suction pumps, and/or
- bleed the secondary flows from the outer flowpath of a turbomachine compressor, flowing from the downstream side towards the upstream side, within the functional clearances existing along the outer casing of the compressor; and direct the airflow thus bled towards a supply to systems useful for operation of the turbomachine, for example such as cooling of hot parts, ventilation of cavities, avionics bleeds, without the use of forced suction means such as suction pumps, and/or
- bleed the boundary layer from profiles of the vanes and/or the blades of the compressor bladed stators and/or bladed rotors; and direct the airflow thus bled towards a supply to systems useful for operation of the turbomachine, for example such as cooling of hot parts, ventilation of cavities, avionics bleeds, without the use of forced suction means such as suction pumps.

According to a first aspect, the invention relates to an air circulation method in a turbomachine compressor, said compressor comprising:
- several compression stages each composed of a bladed rotor and a bladed stator,
- an outer casing and an inner casing, delimiting a flowpath in which the rotor blades and the stator vanes are located,
- an outer part of the flowpath called the "outer flowpath", corresponding to functional clearances between the outer casing and the rotor blades, and
- an inner part of the flowpath called the "inner flowpath", corresponding to functional clearances between the inner casing and stator vanes.

According to a first embodiment, the method comprises the following, for at least one compression stage comprising a stator:
- a suction operation, during which air present in the inner flowpath is sucked in and sent to at least one vane of said stator, and
- at least one bleed operation during which air is bled in said at least one vane of said stator, and is sent outside the compressor.

According to a second, a third and a fourth embodiments, the method also comprises a suction operation during which:
- air is sucked into at least one blade of at least one rotor adjacent to said stator, and is sent into at least one vane of said at least one stator.

According to the second embodiment, the method also comprises a suction operation during which:
- air is sucked into the outer flowpath and is sent into said at least one blade of at least one rotor.

According to the third embodiment, the method also comprises a suction operation during which:
- air is sucked in at the suction face of the profile of said at least one blade of said at least one rotor, and is sent into said at least one blade of said at least one rotor, and
- air is sucked in at the suction face of the profile of said at least one vane of said stator, and is sent into said at least one vane of said stator.

According to the fourth embodiment, the method comprises an operation during which:
- air is sucked into the outer flowpath and is sent into said at least one blade of at least one rotor,
- air is sucked in at the suction face of the profile of said at least one blade of said at least one rotor, and is sent into said at least one blade of said at least one rotor, and
- air is sucked in at the suction face of the profile of said at least one vane of said stator, and is sent into said at least one vane of said stator.

According to the second, third and fourth embodiments, air is sucked into at least one blade of the rotor located on the upstream side of said stator and adjacent to it, and is sent into at least one vane of said at least one stator. The air circulating between the rotor and the stator passes through an inner chamber defined by the inner casing.

According to a fifth embodiment which is an alternative to the fourth embodiment, air is sucked into at least one blade of the rotor located on the downstream side of said stator and adjacent to it, and is sent into at least one vane of said at least one stator.

According to a sixth embodiment that is another alternative to the fourth embodiment, air is sucked into at least one blade of the rotor located on the upstream side of said stator and adjacent to it, and into at least one blade of the rotor located on the downstream side of said stator and adjacent to it, and is sent into at least one vane of said stator.

According to a seventh embodiment that is yet another alternative to the fourth embodiment, air circulating between the rotor and the stator passes through an intermediate chamber defined between the inner casing and an intermediate shell.

According to an eighth embodiment, the method also comprises the following, for at least one other compression stage comprising a stator:
- an additional suction operation, during which air present in the inner flowpath is sucked in and is sent into an intermediate chamber, and
- an additional bleed operation during which air in said intermediate chamber is bled and is sent inside the compressor.

According to the eighth embodiment, the method also comprises an additional optional suction operation during which:
- air is sucked into at least one blade and into at least one rotor adjacent to said stator and is sent into said intermediate chamber.

According to the eighth embodiment, the method also comprises an additional and optional suction operation during which:
- air is sucked into the external flowpath and is sent to said at least one blade of said at least one rotor.

According to the eighth embodiment, the method also comprises an additional and optional suction operation during which:
- air is sucked in at the suction face of the profile of said at least one blade of said at least one rotor, and is sent to said at least one blade of said at least one rotor, and
- air is sucked in at the suction face of the profile of said at least one vane of said at least one stator, and it is sent into the at least one vane of said stator.

According to one alternative to the eighth embodiment, air is sucked into at least one blade of the rotor located on the upstream side of said stator and adjacent to it, and is sent into said intermediate chamber.

According to another alternative to the eighth embodiment, air is sucked into at least one blade of the rotor located on the downstream side of said stator and adjacent to it, and is sent into said intermediate chamber.

According to another alternative to the eight embodiment, air is sucked into at least one blade in each of the two rotors located on each side of said stator, and is sent into said intermediate chamber.

According to a second aspect, the invention relates to a compressor arrangement for use of the air circulation method according to the first aspect, said compressor comprising:
- several compression stages each composed of a bladed rotor and a bladed stator,
- an outer casing and an inner casing, delimiting a flowpath in which the rotor blades and the stator vanes are located,
- an outer part of the flowpath called the "outer flowpath" corresponding to functional clearances between the outer casing and the rotor blades, and
- an inner part of the flowpath called the "inner flowpath" corresponding to functional clearances between the inner casing and the stator vane.

According to a first embodiment, the compressor arrangement includes the following for at least one compression stage with a stator:
- first suction means to suck in air present in the inner flowpath, and to send this air into at least one vane of said stator, and
- bleed means to bleed air in said at least one vane of said stator and to send this air outside the compressor.

According to a second, a third and a fourth embodiments, the compressor arrangement also comprises:
- second suction means to suck air into at least one blade of at least one rotor adjacent to said stator, and to send it into at least one vane of said stator.

According to the second embodiment, the compressor arrangement also comprises:
- third suction means to suck in air originating from the outer flowpath and send it into at least one blade of said at least one rotor.

According to the third embodiment, the compressor arrangement also comprises:
- fourth suction means to suck air in at the suction face of the profile of at least one vane of said stator, and to send it into said at least one vane of said stator, and
- fifth suction means to suck air in at the suction face of the profile of at least one blade of said at least one rotor, and to send it directly into said at least one blade of said at least one rotor.

According to the fourth embodiment, the compressor arrangement comprises:
- third suction means, to suck in air originating from the outer flowpath, and to send it into at least one blade of said at least one rotor.
- fourth suction means to suck in air at the suction face of the profile of at least one vane of said stator, and to send it into said at least one vane of said stator, and
- fifth suction means, to suck air in at the suction face of the profile of at least one blade of said at least one rotor, and to send it directly into said at least one blade of said at least one rotor.

According to the second, third and fourth embodiments, the compressor arrangement comprises second suction means, to suck in air originating from at least one blade of the rotor located on the upstream side of said stator and adjacent to it, and to send it into at least one vane of said stator. Air circulating between the rotor and the stator passes through an inner chamber defined by the inner casing.

According to a fifth embodiment that is an alternative to the fourth embodiment, the compressor arrangement comprises second suction means to suck air into at least one blade of the rotor on the downstream side of said stator and adjacent to it, and to send it into at least one vane of said stator.

According to a sixth embodiment that is another alternative to the fourth embodiment, the compressor arrangement comprises second suction means to suck in air originating from at least one blade in each of the two rotors located on each side of said stator, and to send it into at least one vane of said stator.

According to a seventh embodiment that is yet another alternative to the fourth embodiment, air circulating between the rotor and the stator passes through an intermediate chamber defined between the inner casing and an intermediate shell.

The first suction means comprise an inner cavity in said vane opening up into the inner flowpath through an orifice.

The second suction means comprise an inner cavity in said blade, that opens up in an orifice on the upstream side or the downstream side of said rotor in an inner chamber delimited by the inner casing, and at least one through opening in the inner casing that creates a communication between said inner chamber and the inner flowpath at at least one location facing a vane of said stator.

The third suction means comprise a cavity in said blade that opens up into the outer flowpath through an orifice.

The fourth suction means comprise an inner cavity in said vane and at least one lateral through orifice that creates a communication between the suction face of the profile of said vane and its inner cavity, and fifth suction means comprising an inner cavity in said blade and at least one lateral through orifice that creates a communication between the suction face of the profile of said blade and its inner cavity.

The bleed means comprise a through opening making an inner cavity in said vane communicate with the outside of the flowpath.

According to an eighth embodiment, the compressor arrangement comprises additional suction means that create a communication between an intermediate chamber and the inner chamber. The additional suction means comprise at least one suction duct that passes through the inner casing.

According to a third aspect, the invention relates to a compression stage of a turbomachine comprising a compressor arrangement according to the second aspect of the invention.

According to a fourth aspect, the invention relates to a turbomachine compressor comprising a compressor arrangement according to the second aspect of the invention.

According to a fifth aspect, the invention relates to an aircraft engine equipped with a compressor comprising a compressor arrangement according to the second aspect of the invention.

According to the invention, those skilled in the art could advantageously select one of the proposed arrangements that will satisfy the needs for integration of a compressor into a turbomachine, using one of the suction methods.

The proposed arrangements enable the use of short circuits with low pressure losses for practically all suctions necessary to improve compression and to eliminate or very strongly reduce parasite leaks from a compressor that are usually neglected in arrangements according to prior art.

According to the invention, there is no need to use forced suction systems such as suction pumps or jet venturi type pumps, or other extraction systems consuming large quantities of energy.

BRIEF DESCRIPTION OF THE DRAWINGS

The invention will be better understood after reading the detailed description of embodiments of the invention given below for illustrative purposes only and that is in no way limitative, with reference to the attached drawings in which.

DETAILED PRESENTATION OF PARTICULAR EMBODIMENTS

Figure 1:
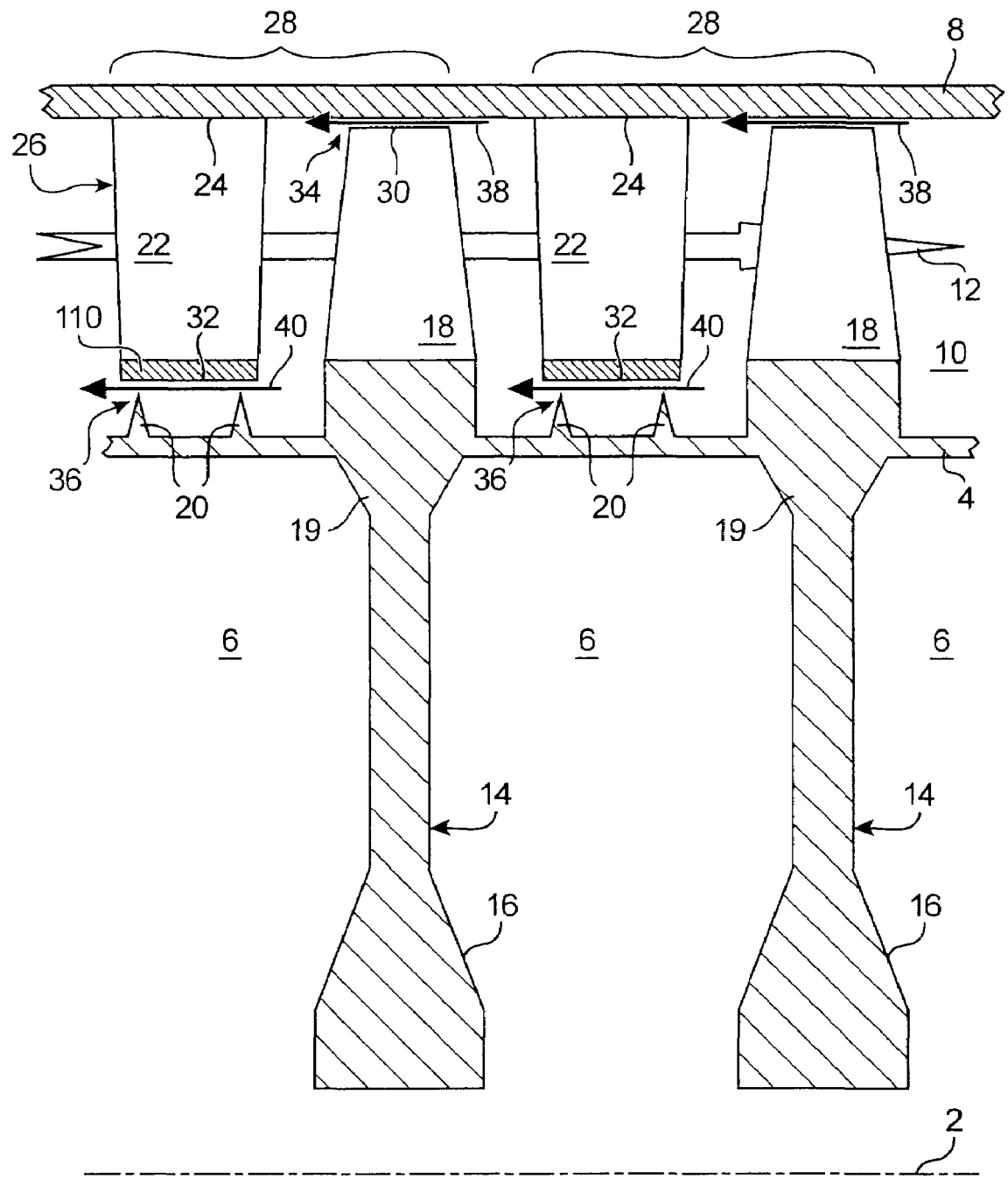
FIG. 1, diagrammatically illustrates a partial section showing a conventional arrangement of a turbomachine compressor.

FIG. 1 diagrammatically and partially illustrates a conventional compressor, in a longitudinal section passing between the vanes and the blades. It comprises a central hub (not shown) with axis 2, an inner approximately annular casing 4 around the hub, delimiting an inner chamber 6 of the compressor and an approximately annular outer chamber 8 around the inner casing 4. The inner casing 4 and the outer casing 8 delimit a flowpath 10 between them along which a main airflow denoted by the arrow 12 in FIG. 1 passes. The arrow 12 defines a flow direction from the upstream side (to the left in the figure) towards the downstream side (to the right in the figure).

The compressor comprises rotors 14, each comprising a disk 16 with axis 2 prolonged by blades 18 distributed around its periphery. The rotors 14 are arranged in the compressor, such that the blades 18 are located in the flowpath 10. The rotors 14 are also connected together through the inner casing 4, approximately at their base 19 through which they are anchored to the corresponding disk 16. On the side of the flowpath 10, the inner casing 4 is provided with relief 20 forming labyrinths, on the portions located between the blades 18 and facing the vanes 22, and this relief will minimise parasite leaks inherent to functional clearances between the fixed and mobile parts.

There are vanes 22 anchored to the outer casing 8 through their base 24, between the blades 18. The vanes 22 are distributed on a section of the outer casing 8, so as to form stators 26.

At their vertex 32, in other words at their end opposite their base 24, the vanes 22 are fixed to a ring 110 that delimits the inner flowpath of the stators 26.

The rotors 14 and the stators 26 are arranged alternately. It follows that each rotor 14 is located between two stators 26, and that each stator 26 is located between two rotors 14. Compression stages 28 in the compressor are defined as being composed of a rotor 14 and a stator 26 directly adjacent to this rotor 14.

The length of the blades 18 is such that their vertexes 30 are close to the outer casing 8 but do not touch it. Consequently, the functional clearances between the vertexes 30 of the blades 18 and the outer casing 8 are not negligible. Similarly, the diameter of the ring 110 is such that the ring is adjacent to but does not touch the relief 20 forming the labyrinths of the inner casing 4. Consequently, the functional clearances between the vertexes 32 of the vanes 22 and the relief 20 of the inner casing 4 are not negligible.

Despite their small size, the functional clearances define passageways 34, 36 through which parasite airflows 38 and 40 flow. Thus, a secondary outer boundary layer flow denoted in FIG. 1 by arrows 38 flows in an outer flowpath 34 defined between the outer casing 8 and the vertexes 30 of the blades 18. Similarly, a secondary inner boundary layer flow denoted in FIG. 1 by arrows 40 flows in an inner flowpath 36 defined between the inner casing 4 and the vertexes 32 of the vanes 22.

FIGS. 2 to 9 illustrate particular embodiments of the air circulation method and the arrangement of the compressor according to the invention. In each case, the compressor is of the type illustrated in FIG. 1, and consequently the same elements are denoted by the same numeric references, and some numeric references are omitted in order to simplify the figures.

Figure 2:
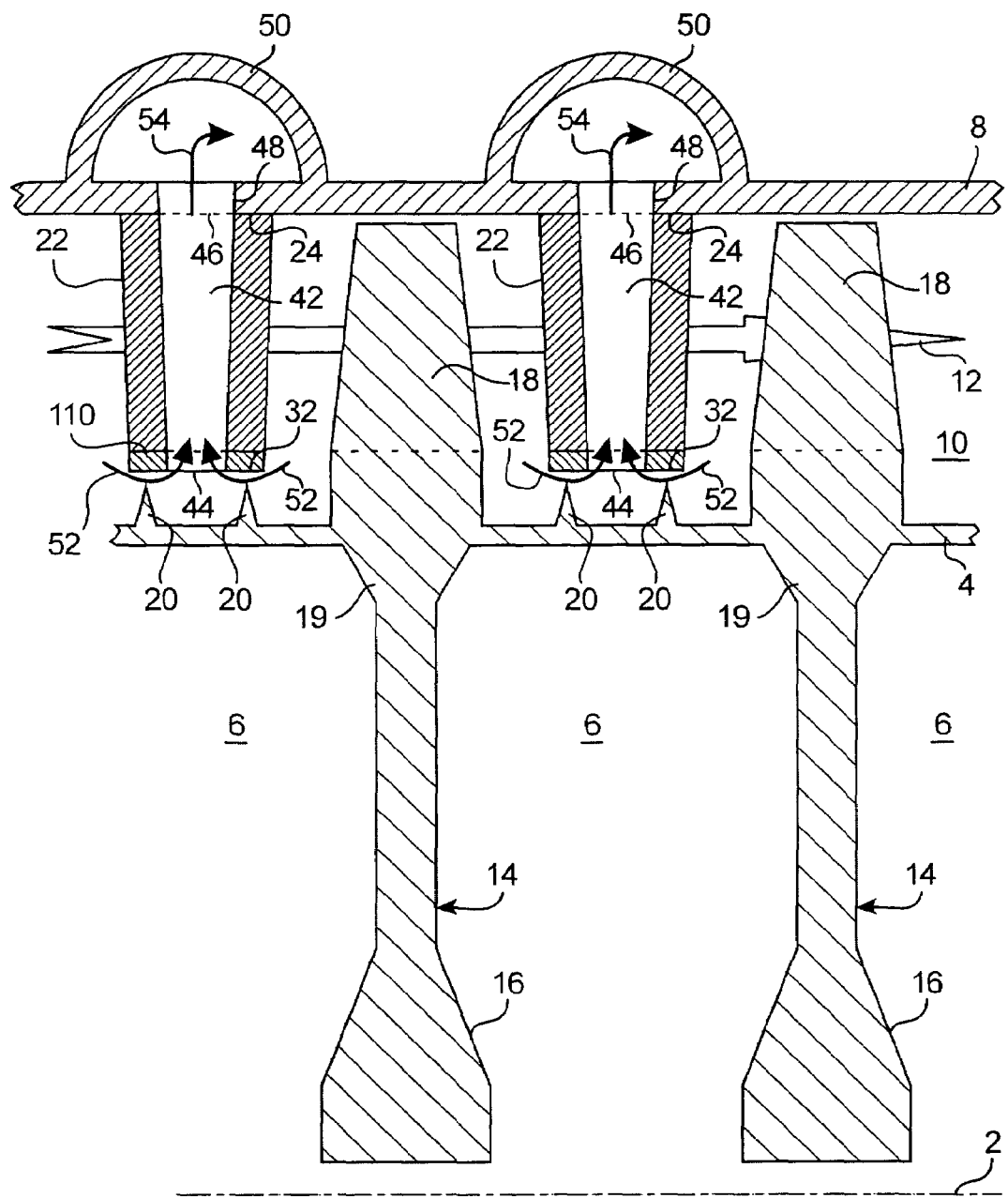
FIG. 2 diagrammatically illustrates a partial section showing a first embodiment of the air circulation method and the compressor arrangement according to the invention.

FIG. 2 illustrates a first embodiment of the air circulation method and the arrangement of the compressor according to the invention, along a longitudinal section passing through the vanes and the blades.

FIG. 2 diagrammatically shows two compression stages 28 of the compressor, each composed of a stator 26 and a rotor 14, the stator 26 being on the upstream side of the rotor 14.

Each vane 22 comprises an inner cavity 42. The inner cavity 42 opens up in the inner flowpath 36 at the vertex 32 of the vane 22 through an orifice 44 that is approximately facing the relief 20 forming labyrinths on the inner casing 4 on the side of the flowpath 10. Each inner cavity 42 opens up at the base 24 of the vane 22 through an orifice 46 that communicates with a through opening 48 of the outer casing 8. Each through opening 48 opens up in turn outside the outer casing 8 in a manifold 50.

It follows from this arrangement of the compression stage that air originating from the inner boundary layer 36 is sucked into the cavities 42 through the orifices 44, as indicated by the arrows 52.

Air sucked in through the cavities 42 is then directed inside the vanes 22 as far as their base 24 and passes successively through their orifice 46 and the corresponding through opening 48 in the outer casing 8 with which this orifice 46 communicates. As indicated by arrows 54, air is then collected in the manifolds 50 for which the operating pressure is less than the pressure in the bleed air orifices 44, 46, because this manifold 50 is connected to an appropriate chamber on the turbomachine.

Figure 3:
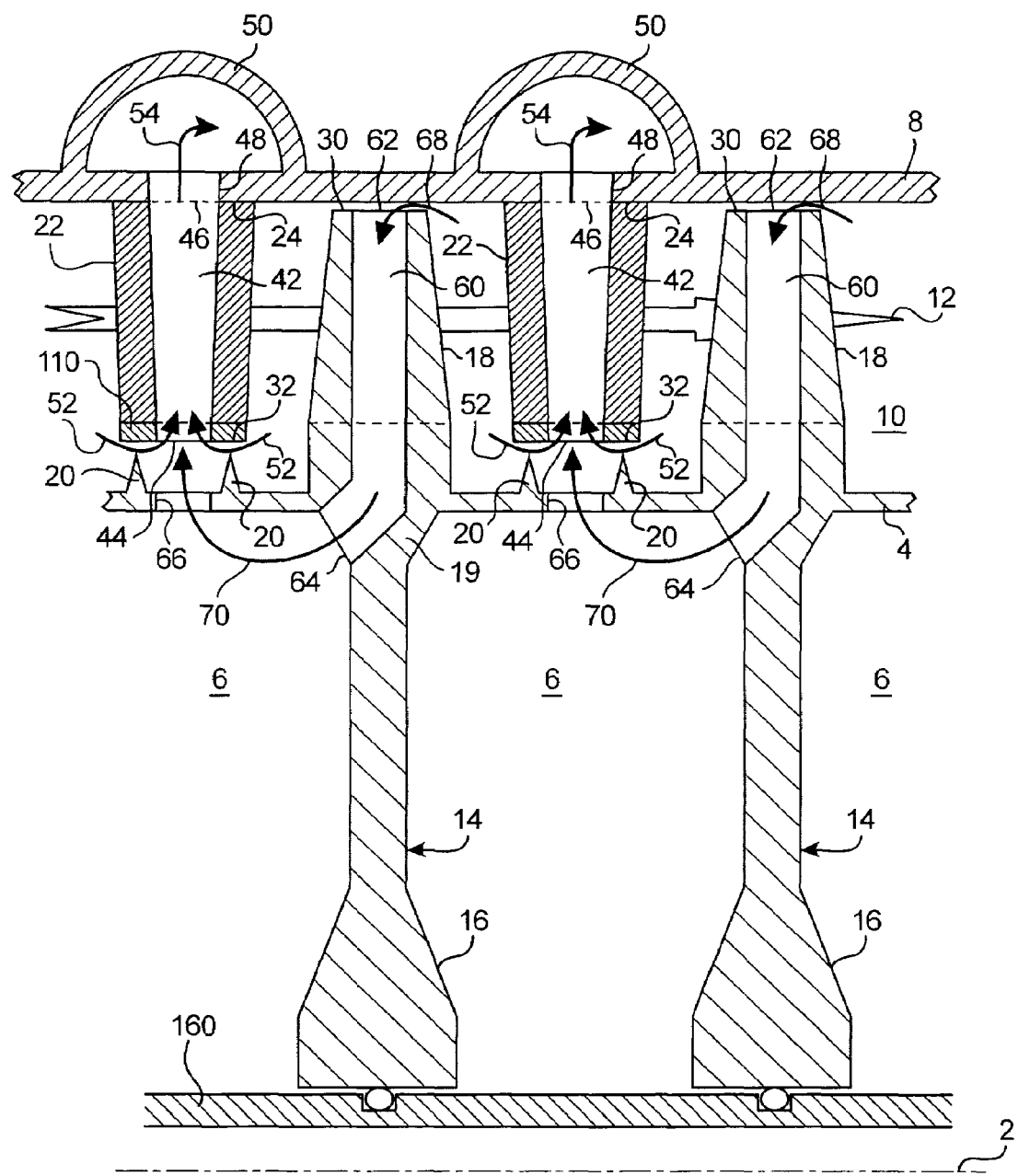
FIG. 3 diagrammatically illustrates a partial section showing a second embodiment of the air circulation method and the compressor arrangement according to the invention.

FIG. 3 illustrates a second embodiment of the air circulation method and compressor arrangement according to the invention, along a longitudinal section passing through the vanes and the blades.

FIG. 3 diagrammatically shows two compression stages 28 of the compressor, each composed of a stator 26 and a rotor 14, the stator 26 being on the upstream side of the rotor 14.

Each vane 22 comprises an inner cavity 42. The inner cavity 42 opens up in the inner flowpath 36 at the vertex 32 of the vane 22 through an orifice 44 that is approximately facing relief 20 forming labyrinths on the inner casing 4 on the side of the flowpath 10. Each inner cavity 42 opens up at the base 24 of the vane 22 through an orifice 46 that communicates with a through opening 48 of the outer casing 8. Each through opening 48 opens up in turn outside the outer casing 8 in a manifold 50.

Furthermore, each blade 18 comprises an inner cavity 60. The inner cavity 60 opens up in the outer flowpath 34 at the vertex 30 of the blade 18 through an orifice 62 facing the outer casing 8. The inner cavity 60 opens up at the base 19 of the blade 18 through an orifice 64 that opens up in an inner chamber 6, on the upstream side of the rotor 14.

Each compression stage comprises an inner chamber 6. Therefore the inner chambers 6 are at different pressures and must not communicate with each other. Consequently, a sealing system 160 is provided that cooperates with each of the disks 16.

Furthermore, the inner casing 4 comprises through openings 66 that make the inner chambers 6 communicate with the inner flowpath 36 at the labyrinths facing the stators 26, on the upstream side of the rotors 14. In the example illustrated, the through openings 66 are in the form of holes arranged in radial directions.

It follows from this arrangement of the compression stage that air originating from the outer boundary layer 34 is sucked into the inner cavities 60 in the blades 18 through the orifices 62, as shown by the arrow 68.

This sucked in air (arrow 68) is then directed inside each blade 18 as far as its base 19, and passes through the orifice 64 of the blade 18 to reach an inner chamber 6 on the upstream side of the rotor 14.

Air is then sucked in through the through openings 66 of the inner casing 4, and is sucked into the cavities 42 in the vanes 22 of the stator 26 immediately on the upstream side of the rotor 14, through the orifices 44 as shown by the arrow 70.

Simultaneously, air originating from the inner boundary layer 36 is sucked into the cavities 42 through the orifices 44 as shown by the arrows 52.

Air sucked into the cavities 42 (arrows 52 and arrow 70) is then directed into the vanes 22 as far as their base 24, and passes in sequence through their orifice 46 and the opening 48 in the outer casing 8 with which this orifice 46 communicates. Air is then collected, as indicated by arrows 54, in manifolds 50, in which the operating pressure is less than the pressure in the bleed air orifices 44, 46, 62, 64, because this manifold 50 is connected to an appropriate chamber in the turbomachine.

Figure 4:
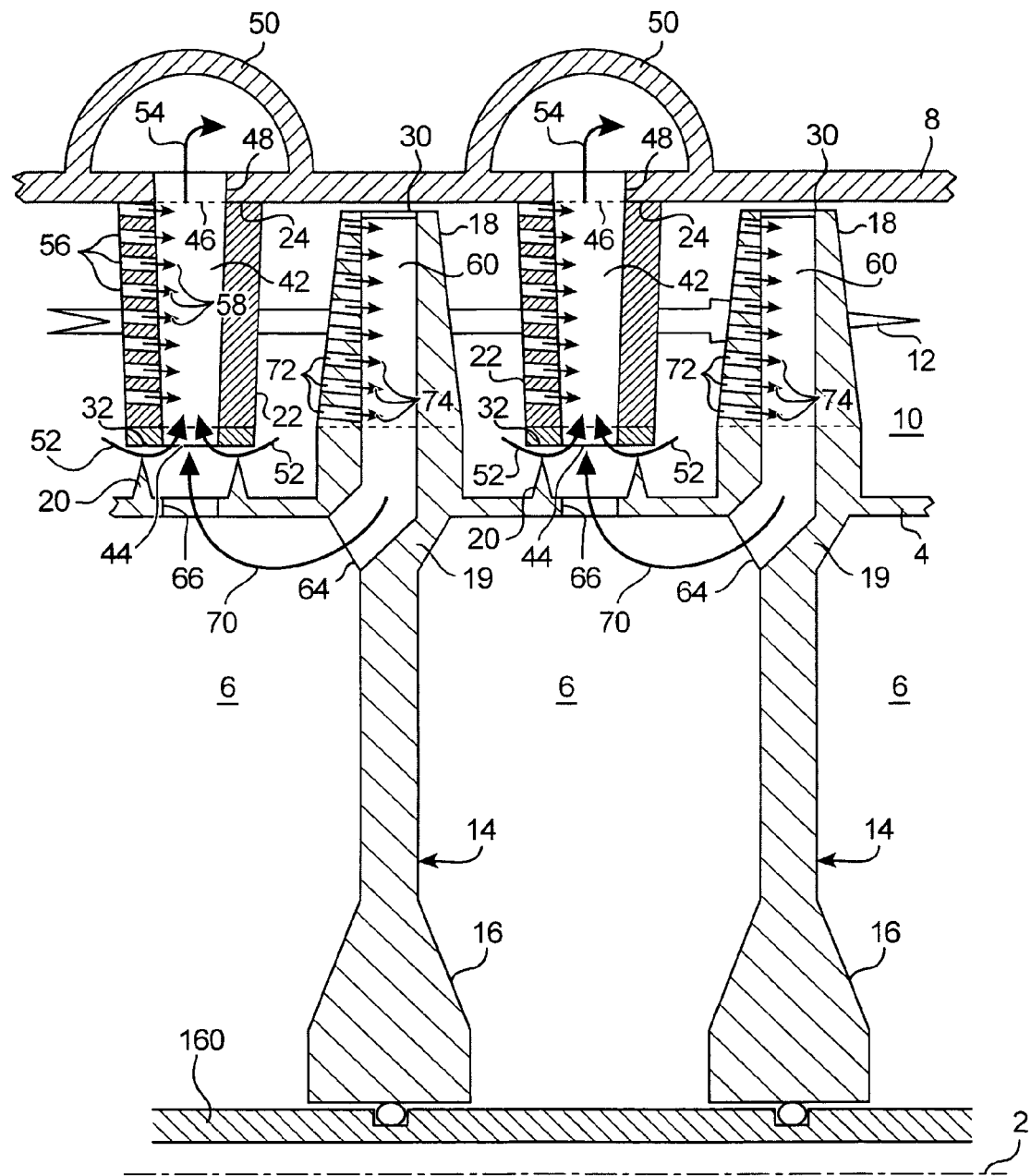
FIG. 4 diagrammatically illustrates a partial section showing a third embodiment of the air circulation method and the compressor arrangement according to the invention.

FIG. 4 illustrates a third embodiment of the air circulation method and the compressor arrangement according to the invention, along a longitudinal section passing through the vanes and the blades.

FIG. 4 diagrammatically shows two compression stages 28 of the compressor, each composed of a stator 26 and a rotor 14, the stator 26 being on the upstream side of the rotor 14.

Each vane 22 comprises an inner cavity 42. The inner cavity 42 opens up in the inner flowpath 36 at the vertex 32 of the vane 22 through an orifice 44 that approximately faces relief 20 forming labyrinths on the inner casing 4 on the side of the flowpath 10. Each inner cavity 42 opens up at the base 24 of the vane 22 through an orifice 46 that communicates with a through opening 48 in the outer casing 8. In turn, each through opening 48 opens up outside the outer casing 8 in a manifold 50.

The vanes 22 also comprise at least one lateral through orifice 56 located on the suction face of the profile that puts the side on the upstream side of the vane 22 into communication with its inner cavity 42.

Furthermore, each of the blades 18 comprises an inner cavity 60. The inner cavity 60 does not open up in the outer flowpath 34 at the vertex 30 of the blade 18. The inner cavity 60 opens up at the base 19 of the blade 18 through an orifice 64 that opens up in an inner chamber 6, on the upstream side of the rotor 14.

A sealing system 160 is provided that cooperates with each of the disks 16.

The blades 18 also comprise at least one lateral through orifice 72 located on the suction face of the profile, that puts the upstream side of the blade 18 into communication with its inner cavity 60.

Note in FIG. 4 and in the other figures that the through orifices 56 and 72 are shown and positioned purely diagrammatically.

Furthermore, the inner casing 4 is provided with through openings 66 that make the inner chambers 6 communicate with the inner flowpath 36 at the labyrinths facing the stators 26 on the upstream side of the rotors 14.

It follows from this arrangement of the compression stage that air originating from the boundary layer at the suction face of each blade 18 is sucked into its inner cavity 60 through the through orifice(s) 72 as shown by arrows 74.

This sucked in air is then directed inside each blade 18 as far as its base 19 and passes through the orifice 64 of the blade 18 to reach the inner chamber 6 on the upstream side of the rotor 14.

Air is then sucked in through the through openings 66 of the inner casing 4, and sucked into the cavities 42 in the vanes 22 of the stator 26 immediately on the upstream side of the rotor 14, through the orifices 44 as shown by the arrow 70.

Simultaneously, air originating from the inner boundary layer 36 is sucked into the cavities 42 through the orifices 44 as shown by the arrows 52.

Simultaneously, air originating from the boundary layer at the suction face of each vane 22 is sucked into its inner cavity 42 through the through orifice(s) 56, as shown by the arrows 58.

Air sucked into the cavities 42 (arrows 52, arrow 70 and arrows 58) is then directed inside the vanes 22 as far as their base 24, and then passes successively through their orifice 46 and the opening 48 in the outer casing 8 with which this orifice 46 communicates. Air is then collected, as shown by the arrows 54, in the manifolds 50, for which the operating pressure is less than the pressure of the bleed air orifices 44, 46, 56, 64, 72, because this manifold 50 is connected to an appropriate chamber of the turbomachine.

Figure 5:
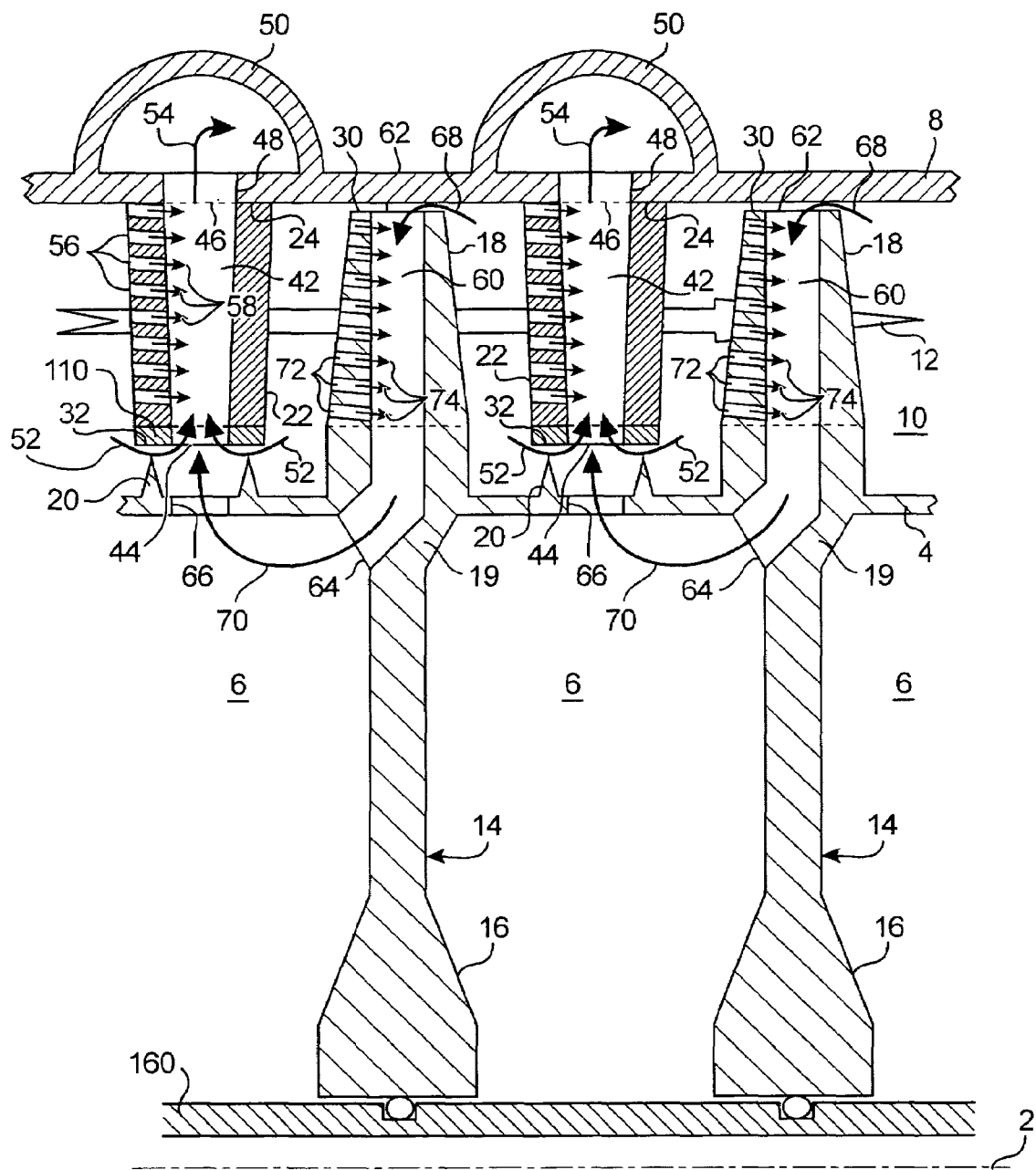
FIG. 5 diagrammatically illustrates a partial section showing a fourth embodiment of the air circulation method and the compressor arrangement according to the invention.

FIG. 5 illustrates a fourth embodiment of the air circulation method and the compressor arrangement according to the invention, along a longitudinal section passing through the vanes and the blades.

FIG. 5 diagrammatically shows two compression stages 28 of the compressor, each composed of a stator 26 and a rotor 14, the stator 26 being on the upstream side of the rotor 14.

Each vane 22 comprises an inner cavity 42. The inner cavity 42 opens up in the inner flowpath 36 at the vertex 32 of the vane 22 through an orifice 44 that is approximately facing the relief 20 forming labyrinths on the inner casing 4 on the side of the flowpath 10. Each inner cavity 42 opens up at the base 24 of the vane 22 through an orifice 46 that communicates with a through opening 48 of the outer casing 8. Each through opening 48 opens up in turn outside the outer casing 8 in a manifold 50.

The vanes 22 also comprise at least one lateral through orifice 56, located on the suction face of the profile, that puts the upstream side of the vane 22 into communication with its inner cavity 42.

Furthermore, each blade 18 comprises an inner cavity 60. The inner cavity 60 opens up in the outer flowpath 34 at the vertex 30 of the blade 18 through an orifice 62 facing the outer casing 8. The inner cavity 60 opens up at the base 19 of the blade 18 through an orifice 64 that opens up in the inner chamber 6, on the upstream side of the rotor 14.

A sealing system 160 is provided that cooperates with each of the disks 16.

The blades 18 also comprise at least one lateral through orifice 72 located on the suction face of the profile, that puts the upstream side of the blade 18 into communication with its inner cavity 60.

Furthermore, the inner casing 4 comprises through openings 66 that make the inner chambers 6 communicate with the inner flowpath 36 at the labyrinths facing the stators 26, on the upstream side of the rotors 14.

The result of this arrangement of the compression stage is that air originating from the boundary layer at the suction face of each blade 18 is sucked into its inner cavity 60 through the through orifice(s) 72, as shown by the arrows 74.

Simultaneously, air originating from the outer boundary layer 34 is sucked into the inner cavities 60 in the blades 18 through orifices 62, as shown by the arrow 68.

This sucked in air (arrows 74 and arrow 68) is then directed inside each blade 18 as far as their base 19, and passes through the orifice 64 of the blade 18 to reach an inner chamber 6, on the upstream side of the rotor 14.

Air is then sucked in through the through openings 66 of the inner casing 4, and is sucked into the cavities 42 in the vanes 22 of the stator 26 immediately on the upstream side of the rotor 14 through orifices 44, as shown by arrow 70.

Simultaneously, air originating from the inner boundary layer 36 is sucked into the cavities 42 through orifices 44, as shown by the arrows 52.

Simultaneously, air originating from the boundary layer at the suction face of each vane 22 is sucked into its inner cavity 42 through the through orifice(s) 56, as shown by the arrows 58.

Air sucked into the cavities 42 (arrows 52, arrow 70 and arrows 58) is then directed inside the vanes 22 as far as their base 24, and then passes successively through their orifice 46 and the opening 48 in the outer casing 8 with which this orifice 46 communicates. Air is then collected, as shown by the arrows 54, in the manifolds 50 for which the operating pressure is less than the pressure of the bleed air orifices 44, 46, 56, 62, 64, 72, because this manifold 50 is connected to an appropriate chamber in the turbomachine.

Figure 6:
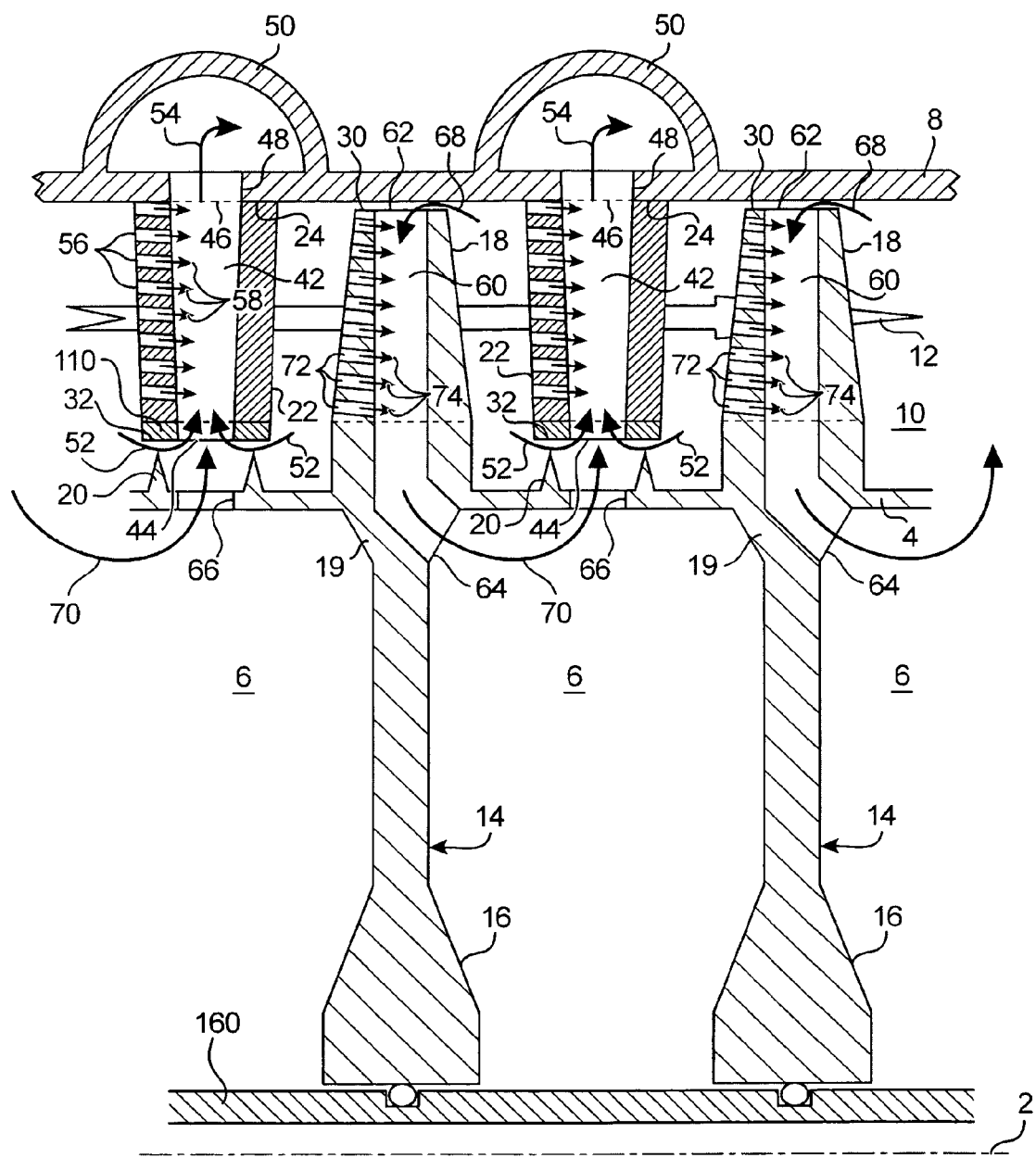
FIG. 6 diagrammatically illustrates a partial section showing a fifth embodiment of the air circulation method and the compressor arrangement according to the invention.

FIG. 6 illustrates a fifth embodiment of the air circulation method and the compressor arrangement according to the invention, along a longitudinal section passing through the vanes and the blades.

FIG. 6 diagrammatically shows two compression stages 28 of the compressor, each composed of a stator 26 and a rotor 14, the stator 26 being on the upstream side of the rotor 14.

This fifth embodiment is an alternative to the fourth embodiment. It is different in that the inner cavity 60 of the blades 18 opens up at the base 19 of the blade 18 through an orifice 64 that opens up in the inner chamber 6, on the downstream side of the rotor 14, and not on the upstream side of this rotor.

Figure 7:
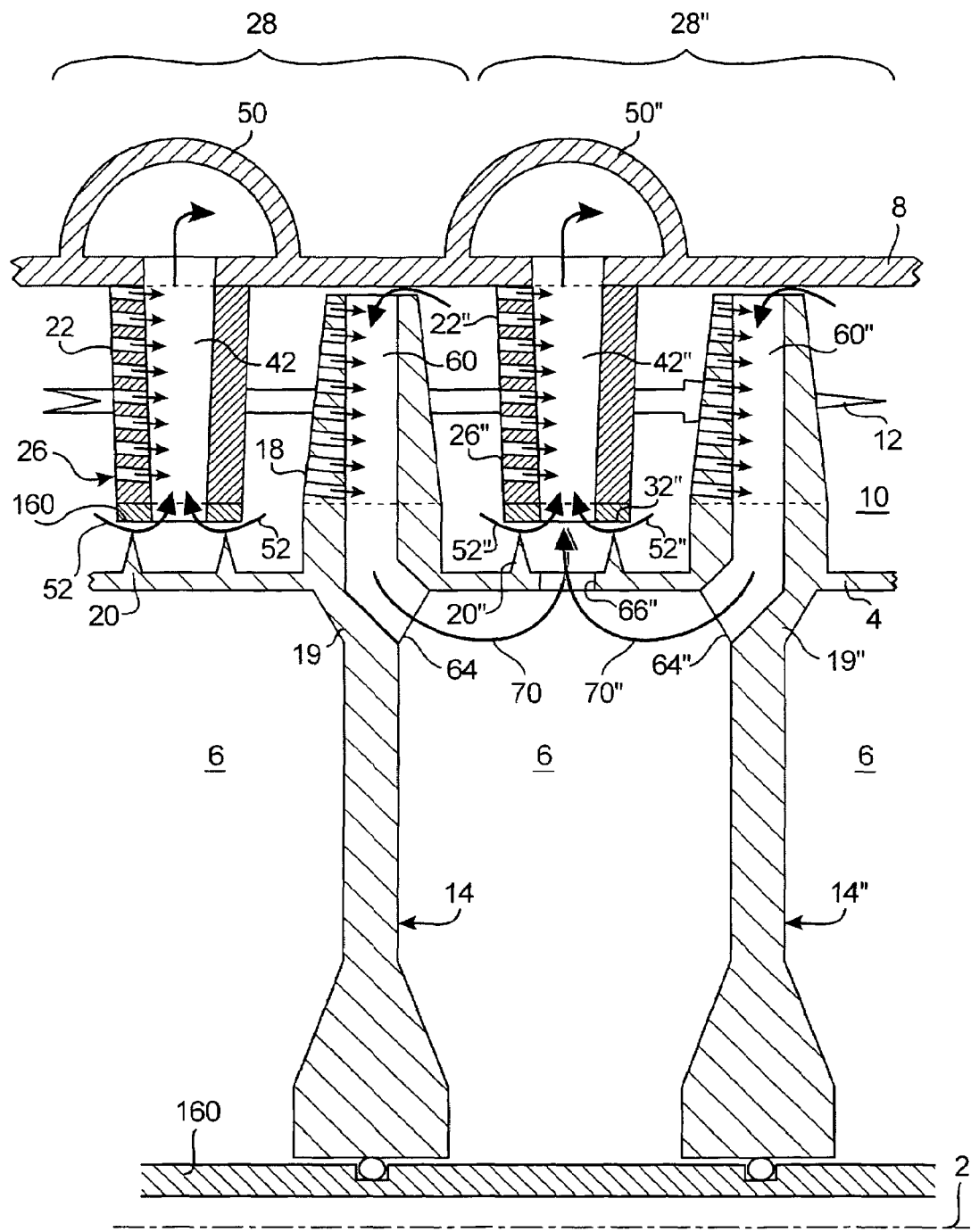
FIG. 7 diagrammatically illustrates a partial section showing a sixth embodiment of the air circulation method and the compressor arrangement according to the invention.

FIG. 7 illustrates a sixth embodiment of the air circulation method and the compressor arrangement according to the invention, along a longitudinal section passing through the vanes and the blades.

FIG. 7 diagrammatically illustrates two compression stages 28, 28" of the compressor, each composed of a stator 26, 26" and a rotor 14, 14", the stator 26, 26" being on the upstream side of the rotor 14, 14".

This sixth embodiment is another alternative to the fourth embodiment. According to the sixth embodiment, the inner cavities 60, 60" in the blades 18, 18" open up at the base 19, 19" of the corresponding blade 18, 18" through an orifice 64, 64" that opens up in the inner chamber 6. According to this variant embodiment, the orifice 64 of the upstream blade 18 opens up on the downstream side of the upstream rotor 14, while the orifice 64" of the downstream blade 18" opens up on the upstream side of the downstream rotor 14".

It follows from this arrangement that air originating from the orifice 64" of the downstream rotor 14" is sucked in through the through openings 66" in the inner casing 4 facing the labyrinths at the downstream stator 26", as shown by arrow 70", in the same way as in the embodiments described previously. Another result of this arrangement is that air originating from the orifice 64 in the upstream rotor 14 is sucked in through the same through openings 66" at the downstream stator 26", as shown by arrow 70. Thus, air originating from the downstream blades 18" and the upstream blades 18 is sucked in through these downstream through openings 66" into the cavities 42" in the vanes 22" of the downstream stator 26".

Figure 8:
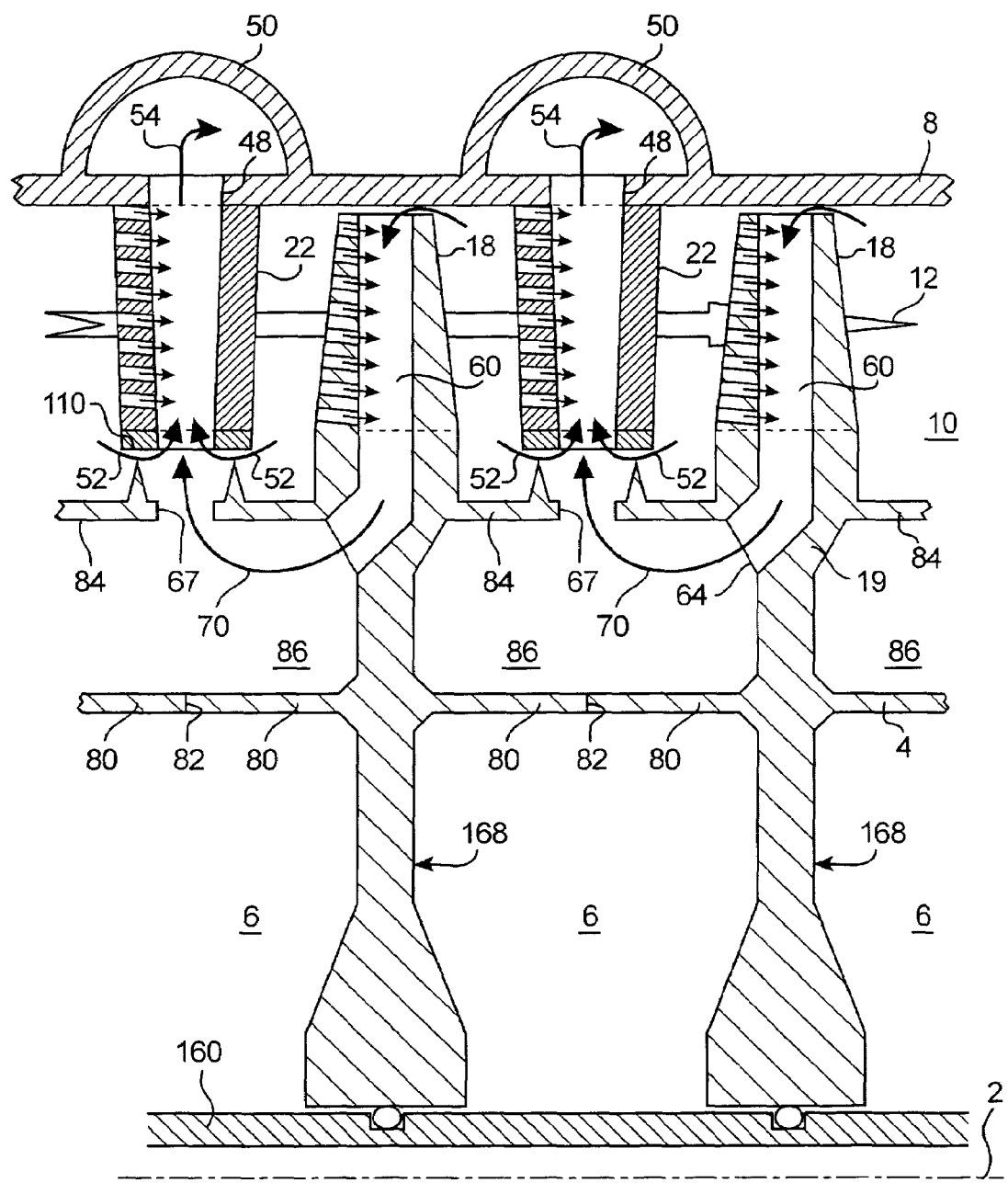
FIG. 8 diagrammatically illustrates a partial section showing a seventh embodiment of the air circulation method and the compressor arrangement according to the invention.

FIG. 8 illustrates a seventh embodiment of the air circulation method and the compressor arrangement according to the invention, along a longitudinal section passing through the vanes and the blades.

This seventh embodiment is yet another alternative to the fourth embodiment. It may be combined with the fifth or with the sixth embodiment described above. This seventh embodiment will be described only considering its differences with the previous embodiments.

FIG. 8 diagrammatically illustrates two compression stages 28 of the compressor, each composed of a stator 26 and a rotor 14, the stator 26 being on the upstream side of the rotor 14.

This seventh embodiment is particularly suitable for compressors for which the rotors 14 comprise single-piece bladed disks 168 in which the disk 16 and the blade 18 are in a single-piece.

The single-piece bladed disks 168 are connected to each other approximately under the base 19 of the blades 18, through shells 80 assembled to each other at a median welding plane 82. These shells 80 welded together thus form the inner casing 4 that, with each pair of two single-piece bladed disks 168, make up the compressor rotor.

An intermediate shell 84, located between the inner casing 4 and the outer casing 8, extends on each side of the single-piece disk 168, and delimits an intermediate chamber 86 with the inner casing 4. In this seventh embodiment, the flowpath 10 is delimited between the outer casing 8 and the base of the vanes 22 and the blades 18. The relief 20 forming labyrinths is made on the intermediate shell 84, on the side of the flowpath 10, on portions facing the vanes 22. At these labyrinths, the intermediate casing 84 comprises a through opening 67, which is in the form of a continuous radially oriented slit in the example illustrated. This through opening 67 performs a function similar to the function of the through openings 66 in the inner casing 4 in previously described embodiments.

It follows from this arrangement that air originating from the orifice 64 of the blade 18 reaches in an intermediate chamber 86 on the upstream side of the rotor 14. This air is then sucked in through the through opening 67 of the intermediate casing 84, and is sucked into the cavities 42 in the vane 22, as shown by arrow 70.

In this embodiment, the pressures in the intermediate chambers 86 in the different compression stages are independent, by construction. Consequently, there is no need to provide a sealing system 160 like that in previous embodiments.

Figure 9:
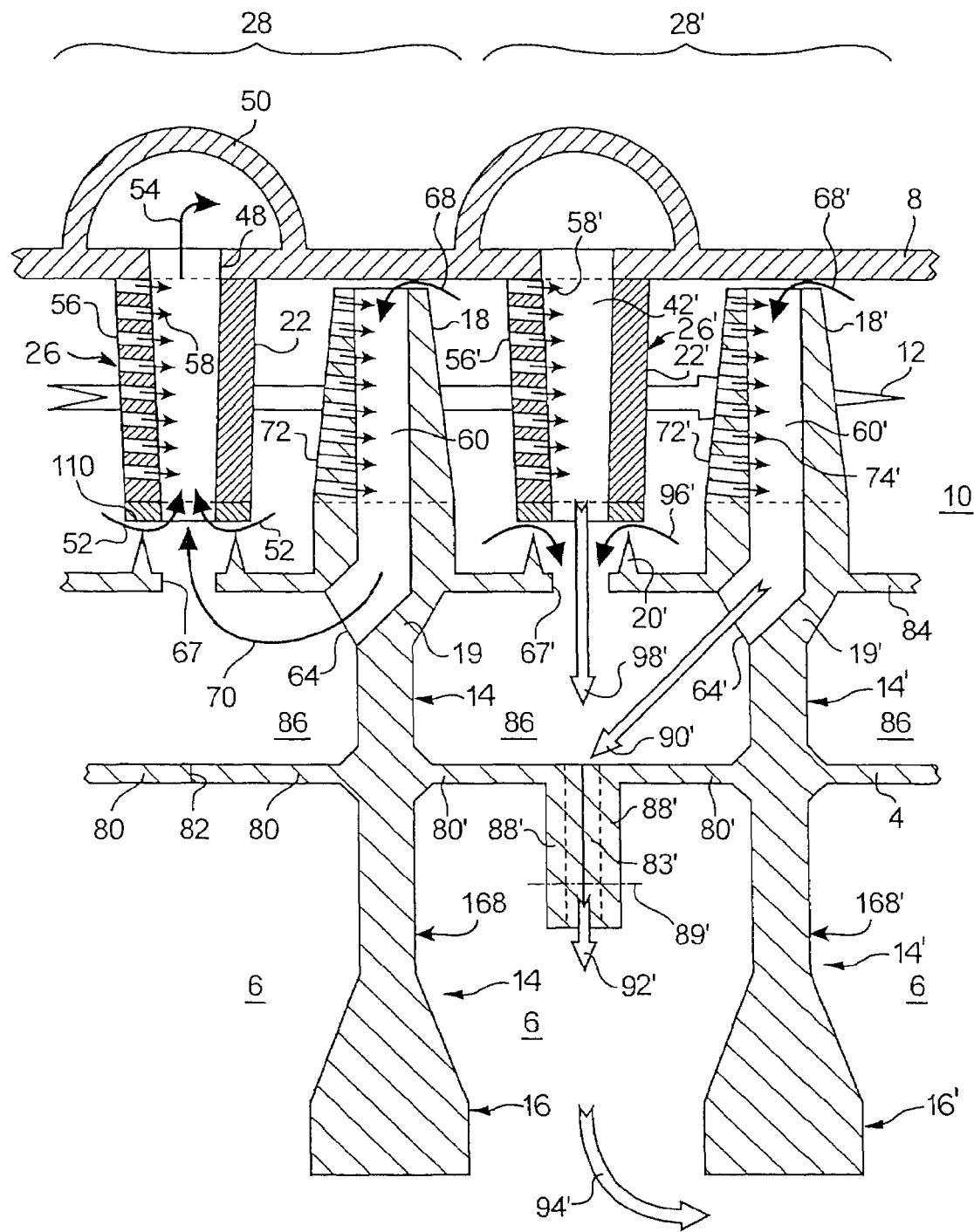
FIG. 9 diagrammatically illustrates a partial section showing an eighth embodiment of the air circulation method and the compressor arrangement according to the invention.

FIG. 9 illustrates an eighth embodiment of the air circulation method and the compressor arrangement according to the invention, along a longitudinal section passing through the vanes and the blades.

This eighth embodiment is a possible variant of the seventh embodiment. It may be combined with the fifth or the sixth embodiment described above. This eighth embodiment will be described only considering its differences with the previous embodiments.

FIG. 9 diagrammatically illustrates two compression stages 28, 28' of the compressor, each composed of a stator 26, 26' and a rotor 14, 14', the stator 26, 26' being on the upstream side of the rotor 14, 14'.

This eighth embodiment is particularly suitable for compressors for which the rotors 14, 14' comprise single-piece bladed disks 168, 168' in which the disk 16, 16' and the blade 18, 18' are made from a single-piece.

The single-piece bladed disks 168, 168' are connected to each other approximately under the base 19, 19' of the blades 18, 18', through shells 80, 80'.

In the same way as the seventh embodiment, an intermediate shell 84 located between the inner casing 4 and the outer casing 8 connects the blades 18, 18' together approximately at their base 19, 19' and delimits an intermediate chamber 86 with the bases 19, 19' of the blades 18, 18' and with the inner casing 4. The flowpath 10 is delimited between the outer casing 8 and the intermediate shell 84. The relief 20, 20' forming labyrinths is made on the intermediate shell 84, on the side of the flowpath 10, on portions located facing the vanes 22, 22'. The intermediate shell 84 comprises continuous through openings 67, 67' at these labyrinths, approximately facing each vane 22, 22'.

For the compression stage 28 at the left in FIG. 9, the shells 80 are assembled together on a welding plane 82, in a manner similar to the seventh embodiment previously described.

For the compression stage 28' at the right in FIG. 9, the shells 80' are assembled together by connecting flanges 88'.

The set of shells 80 and 80' between the single-piece bladed disks 168, 168' respectively, forms the inner casing 4.

The connecting flanges 88' are held together by support means 89', for example screws, and together define a suction duct 83' in the radial direction. The suction duct 83' is approximately facing the through opening 67'. It creates a communication between the intermediate chamber 86 and the inner chamber 6 between the single-piece bladed disks 168, 168'.

The two compression stages 2.8, 28' behave differently, because their arrangements are different.

For the compression stage 28 at the left in FIG. 9, air originating from the boundary layer of the blade 18 is sucked into its inner cavity 60 through the through orifice(s) 72 as shown by the arrows 74, in a manner similar to the seventh embodiment.

Simultaneously, air originating from the outer boundary layer 34 is sucked into the inner cavities 60 in the blades 18 through the orifices 62, as shown by arrow 68.

This sucked in air (arrows 58 and 68) is then directed inside the blade 18 as far as its base 19, and passes through the orifice 64 of the blade 18 to reach the intermediate chamber 86, on the upstream side of the single-piece laded disk 168.

Air is then sucked in through the through opening 67 of the intermediate shell 84, and is sucked into the cavities 42 in the vanes 22 of the stator 26 immediately on the upstream side of the single-piece bladed disk 168, through the orifices 44 as shown by the arrow 70.

Simultaneously, air originating from the inner boundary layer 36 is sucked into the cavities 42 through orifices 44, as shown by the arrows 52.

Simultaneously, air originating from the boundary layer at the suction face of each vane 22 is sucked into its inner cavity 42 through the through orifice(s) 56, as shown by the arrows 58.

Air sucked into the cavities 42 (arrows 52, arrow 70 and arrows 58) is then directed inside the vanes 22 as far as their base 24, and then passes successively through their orifice 46 and the opening 48 in the outer casing 8 with which this orifice 46 communicates. Air is then collected, as shown by the arrows 54, in the manifold 50 in which the operating pressure is less than the pressure in the bleed air orifices 44, 46, 56, 64, 72, because this manifold 50 is connected to an appropriate chamber of the turbomachine.

For the compression stage 28' at the right in FIG. 9, air originating from the boundary layer of the blade 18' is sucked into its inner cavity 60' through the through orifice(s) 72', as shown by the arrows 74'.

Simultaneously, air originating from the outer boundary layer 34 is sucked into the inner cavities 60' in the blades 18' through the orifices 62', as shown by arrow 68'. This sucked in air (arrows 74' and 68') is then directed inside the blade 18' as far as its base 19', and passes through the orifice 64' of the blade 18' as shown by arrow 90', to reach the intermediate chamber 86, on the upstream side of the single-piece bladed disk 168'.

Simultaneously, air originating from the inner boundary layer 36 is sucked in through the through opening 67' in the intermediate shell 84 as shown by arrow 96', to reach the intermediate chamber 86.

Simultaneously, air originating from the boundary layer at the suction face of each vane 22 is sucked into its inner cavity 42 through the through orifice(s) 56, as shown by the arrows 58'. Air sucked into the cavities 42' (arrows 58') is then directed inside the vanes 22' as far as their vertex 32'. This air is then sucked in through the through opening 67' of the intermediate shell 84, as shown by arrow 98', to reach the intermediate chamber 86.

Air originating from the blades 18', from the inner boundary layer 36 and from the vanes 22' is then sucked in as shown by arrow 92', through the ducts 83' formed between the connecting flanges 88' of the shells 80', and flows into the inner chamber 6, from where it can be directed to other parts of the turbomachine, as shown by arrow 94'.

With this arrangement of the two compressor stages 28, 28' according to the eighth embodiment, air sucked in at the compressor stage 28 at the left in FIG. 9, is transferred outside the compressor, and air sucked in at the compressor stage 28' at the right in FIG. 9, is transferred inside the compressor.

The eighth embodiment has just been described in the case in which air sucked into the intermediate chamber 86 originates simultaneously from:
the inner boundary layer (arrows 96'),
the outer boundary layer (arrows 68'), through cavities 60' in the blades 18' (arrows 90'),
the boundary layer at the suction face of the blades (arrows 74'), through cavities 60' in the blades (arrows 90'),
the boundary layer at the suction face of the vanes (arrows 58'), through cavities 42' in the vanes (arrows 98').

A first alternative (not explicitly represented) of this eighth embodiment concerns the case in which the vanes 22' do not comprise any through orifices 56' and the blades 18' do not comprise any through orifices 72'. Air sucked into the intermediate chamber 86 then originates only from the inner boundary layer (arrows 96') and the outer boundary layer (arrows 68').

A second alternative (not explicitly represented) of this eighth embodiment concerns the case in which the blades 18' do not comprise an orifice 62' at their vertex 30'. Air sucked into the intermediate chamber 86 then originates only from the inner boundary layer (arrows 96'), the boundary layer at the suction face of the blades (arrows 74') and the boundary layer at the suction face of the vanes (arrows 98').

A third alternative (not explicitly represented) of this eighth embodiment relates to the case in which the vanes 22' do not comprise through orifices 56' and the blades 18' do not comprise through orifices 72' or an orifice 62' at their vertex. Air sucked into the intermediate chamber 86 then originates only from the inner boundary layer (arrows 96').

In the third to eighth embodiments that have just been described, the through orifices 56 and/or 72 may be holes or slits or a porous wall or any other means known to those skilled in the art to suck in the boundary layer developing around the blades. The number of orifices is determined as a function of the dimensions of the flowpath 10 and the dimensions of the vanes 22 and/or the blades 18.

For all the embodiments described above, the size of the inner cavity 42 in a vane 22, and of the inner cavity 60 in a blade 18, is increased when this vane 22 or this blade 18 receives air sucked in through one or more through orifices 56 or 72 respectively, in addition to air originating from the inner boundary layer 36, or the outer boundary layer 38 respectively. As a variant, the cavities 42 in the vanes 22 may be multiple cavities and/or cavities 60 in the blades 18 may be multiple cavities. This enables the compressor arrangement to be adapted to different possible pressure levels.

Furthermore, in the inner cavity 42 in a vane 22, and in the inner cavity 60 in a blade 18, the different airflows sucked in may be mixed or may be routed through said cavity 42, 60 respectively through separate ducts.

For all the embodiments described above, and for all their different variants, the air in the manifolds 50 can then be sent to another part of the turbomachine in which the pressure is such that it can be used, for example to the cooling circuit of a low pressure turbine or to supply pressurised chambers, or towards avionics bleed, or to other applications.

This invention is not limited to the embodiments and their variants that have just been described, but is also applicable to combinations of them. Furthermore, one compressor may comprise one or several compression stages each with an arrangement according to the invention.

The invention claimed is:

1. An air circulation method in a turbomachine compressor, said compressor comprising:
    several compression stages each composed of a bladed rotor with blades and a bladed stator with vanes,
    an outer casing and an inner casing, delimiting a flowpath in which the blades of the rotor and the vanes of the stator are located, a main airflow passing through said flowpath,
    an outer part of the flowpath called the outer flowpath, corresponding to functional clearances between the outer casing and the blades of the rotor, and
    an inner part of the flowpath called the inner flowpath, corresponding to functional clearances between the inner casing and the vanes of the stator,
    the method comprising the following steps, for at least one compression stage comprising a stator:
    providing labyrinths on said inner casing between said two adjacent blades, said labyrinths facing a vane between said two adjacent blades, wherein said labyrinths do not touch said vane such that said functional clearances defining said inner flowpath are present between said labyrinths and said vane,
    sucking in air from the main airflow, through said functional clearances between said labyrinths and said vane and through a radially inner orifice of said vane faced by said labyrinths, directing the sucked in air through said vane,
    bleeding said air from said vane through a radially outer opening of said vane and through an orifice of said outer casing, and
    collecting said air from said vane into a manifold outside the compression stage.

2. An air circulation method according to claim 1, further comprising sucking air into at least one blade of at least one rotor adjacent to said stator, and sending said air into at least one vane of said at least one stator.

3. An air circulation method according to claim 2, further comprising sucking air into the outer flowpath and sending said air into the at least one blade of at least one rotor.

4. An air circulation method according to claim 2, further comprising sucking air in at a suction face of a profile of said at least one blade of said at least one rotor, and sending said air into said at least one blade of said at least one rotor, and sucking in said air at the suction face of the profile of said at least one vane of said stator, and sending said air into said at least one vane of said stator.

5. An air circulation method according to claim 3, further comprising sucking air in at a suction face of a profile of said at least one blade of said at least one rotor, and sending said air into said at least one blade of said at least one rotor, and sucking said air in at the suction face of the profile of said at least one vane of said stator, and sending said air into at least one vane of said stator.

6. An air circulation method according to claim 2, comprising sucking air into at least one blade of the rotor located on an upstream side of said stator and adjacent to said stator, and sending said air into at least one vane of said stator.

7. An air circulation method according to claim 2, comprising sucking air into at least one blade of the rotor located on a downstream side of said stator and adjacent to said stator, and sending said air into at least one vane of said stator.

8. An air circulation method according to claim 2, comprising sucking air into at least one blade in each of the two rotors located on each side of said stator, and sending said air into at least one vane of said stator.

9. An air circulation method according to claim 1, further comprising sucking air and sending said air into an intermediate chamber, and bleeding said air from said intermediate chamber inside the compressor.

10. An air circulation method according to claim 9, comprising sucking air into at least one blade of at least one rotor adjacent to said stator, and sending said air into said intermediate chamber.

11. An air circulation method according to claim 10, comprising sucking air into the outer flowpath and sending the air into said at least one blade of said at least one rotor.

12. An air circulation method according to claim 10, comprising sucking air in at a suction face of a profile of said at least one blade of said at least one rotor, and sending the air into said at least one blade of said at least one rotor, and sucking air in at the suction face of the profile of said at least one vane of said at least one stator, and sending the air into said at least one vane of said stator.

13. An air circulation method according to claim 10, comprising sucking air into at least one blade of the rotor located on an upstream side of said stator and adjacent to the stator, and sending the air into said intermediate chamber.

14. An air circulation method according to claim 10, comprising sucking air into at least one blade in each of the two rotors located on each side of said stator, and sending the air into said intermediate chamber.

15. A compressor arrangement for circulating air, said compressor arrangement comprising:

several compression stages each composed of a bladed rotor with blades and a bladed stator with vanes, an outer casing and an inner casing, delimiting a flowpath in which the blades of each rotor and the vanes of each stator are located, a main airflow passing through said flowpath, an outer part of the flowpath called the outer flowpath, corresponding to functional clearances between the outer casing and the blades of each rotor, and an inner part of the flowpath called the inner flowpath, corresponding to functional clearances between the inner casing and the vanes of each stator, the compressor arrangement further comprising, for at least one compression stage comprising a stator:

labyrinths on said inner casing between two adjacent blades, said labyrinths facing a vane between said two adjacent blades, wherein said labyrinths do not touch said vane such that said functional clearances defining said inner flowpath are present between said labyrinths and said vane, first suction means for sucking in air from the main airflow, through said functional clearances between said labyrinths and the vane, and for sending said air into said vane of said stator, and bleed means for bleeding air in said vane of said stator and for sending said air outside the compressor.

16. A compressor arrangement according to claim 15, further comprising:

second suction means for sucking air into at least one blade of at least one rotor adjacent to said stator, and for sending said air into at least one vane of said stator.

17. A compressor arrangement according to claim 16, further comprising:

third suction means for sucking air into the outer flowpath, and for sending said air into at least one blade of said at least one rotor.

18. A compressor arrangement according to claim 16 further comprising:

fourth suction means for sucking air in at a suction face of a profile of at least one vane of said stator, and for sending said air into said at least one vane of said stator, and fifth suction means for sucking air in at the suction face of the profile of at least one blade of said at least one rotor, and for sending said air directly into said at least one blade of said at least one rotor.

19. A compressor arrangement according to claim 17, further comprising:

fourth suction means for sucking air in at a suction face of a profile of at least one vane of said stator, and for sending said air into said at least one vane of said stator, and fifth suction means for sucking air in at the suction face of the profile of at least one blade of said at least one rotor, and for sending said air directly into said at least one blade of said at least one rotor.

20. A compressor arrangement according to claim 16, further comprising:

second suction means for sucking air into at least one blade of the rotor located on the upstream side of said stator, and for sending said air into at least one vane of said stator.

21. A compressor arrangement according to claim 16, further comprising:

second suction means for sucking air into at least one blade of the rotor located on the downstream side of said stator, and for sending said air into at least one vane of said stator.

22. A compressor arrangement according to claim 16, further comprising:

second suction means for sucking air into at least one blade in each of the two rotors located on each side of said stator, and for sending said air into at least one vane of said stator.

23. A compressor arrangement according to claim 15, wherein said first suction means comprise an inner cavity in said vane opening up into the inner flowpath through an orifice.

24. A compressor arrangement according to claim 16, wherein said second suction means comprise:

an inner cavity in said blade, that opens up in an orifice on the upstream side or the downstream side of said rotor in an inner chamber delimited by the inner casing, and at least one through opening in the inner casing that creates a communication between said inner chamber and the inner flowpath at least one location facing a vane of said stator.

25. A compressor arrangement according to claim 17, wherein said third suction means comprise an inner cavity in said blade, that opens up in an orifice in the outer flowpath.

26. A compressor arrangement according to claim 18, wherein:
said fourth suction means comprise an inner cavity in said vane and at least one lateral through orifice that creates a communication between the suction face of said vane and its inner cavity, and
said fifth suction means comprise an inner cavity in said blade and at least one lateral through orifice that creates communication between the suction face of said blade and its inner cavity.

27. A compressor arrangement according to claim 19, wherein:
said first suction means comprise an inner cavity in said vane opening up in the inner flowpath through an orifice,
said second suction means comprise:
an inner cavity in said blade that opens up in an orifice on an upstream side or a downstream side of said rotor in an inner chamber delimited by the inner casing, and
at least one through opening in the inner casing that creates a communication between said inner chamber and the inner flowpath at least one location facing a vane of said stator,
said third suction means comprise an inner cavity in said blade, that opens up in an orifice in the outer flowpath,
said fourth suction means comprise an inner cavity in said vane and at least one lateral through orifice that creates a communication between the suction face of said vane and its inner cavity, and
said fifth suction means comprise an inner cavity in said blade and at least one lateral through orifice that creates a communication between a suction face of said blade and its inner cavity.

28. A compressor arrangement according to claim 15, wherein said bleed means comprise a through opening that creates a communication between an inner cavity of said vane and the outside of the flowpath.

29. A compressor arrangement according to claim 27, wherein said bleed means comprise a through opening that creates communication between an inner cavity of said vane and the outside of the flowpath.

30. A compressor arrangement according to claim 29, wherein said bleed means also comprise at least one manifold in which said through opening opens up.

31. A compressor arrangement according to claim 15, further comprising an intermediate shell located between the inner casing and the outer casing, that connects the blades to each other, and that delimits an intermediate chamber with the blades and with said inner casing.

32. A compressor arrangement according to claim 27, further comprising an intermediate shell located between the inner casing and the outer casing, that connects the blades to each other, and that delimits an intermediate chamber with the blades and with said inner casing.

33. A compressor arrangement according to claim 32, further comprising additional suction means, that create a communication between said intermediate chamber and the inner chamber.

34. A compressor arrangement according to claim 33, wherein said additional suction means comprise at least one suction duct defined between the connecting flanges of the shells assembled to each other to form the inner casing.

35. An air compression stage of a turbomachine, wherein said air compression stage comprises a compressor arrangement according to claim 15.

36. An air compression stage of a turbomachine, wherein said air compression stage comprises a compressor arrangement according to claim 27.

37. An aircraft engine equipped with a compressor comprising at least one compressor arrangement according to claim 15.

38. An aircraft engine equipped with a compressor comprising at least one compressor arrangement according to claim 27.

\* \* \* \* \*